E. F. W. ALEXANDERSON.
HIGH FREQUENCY ALTERNATOR.
APPLICATION FILED OCT. 19, 1911.

1,110,028.

Patented Sept. 8, 1914.

WITNESSES:
Earl G. Klock.
J. Ellis Glen

INVENTOR:
ERNST F. W. ALEXANDERSON
BY
HIS ATTORNEY

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

HIGH-FREQUENCY ALTERNATOR.

1,110,028. Specification of Letters Patent. Patented Sept. 8, 1914.

Application filed October 19, 1911. Serial No. 655,480.

*To all whom it may concern:*

Be it known that I, ERNST F. W. ALEXANDERSON, a citizen of the United States, residing at Schenectady, county of Schenectady, State of New York, have invented certain new and useful Improvements in High-Frequency Alternators, of which the following is a specification.

My invention relates to high frequency alternators of the type disclosed in Patent #1,008,577 issued to me and consists in a number of features constituting improvements in the alternator described in that patent which will best be understood by reference to the accompanying drawings.

Figure 1:
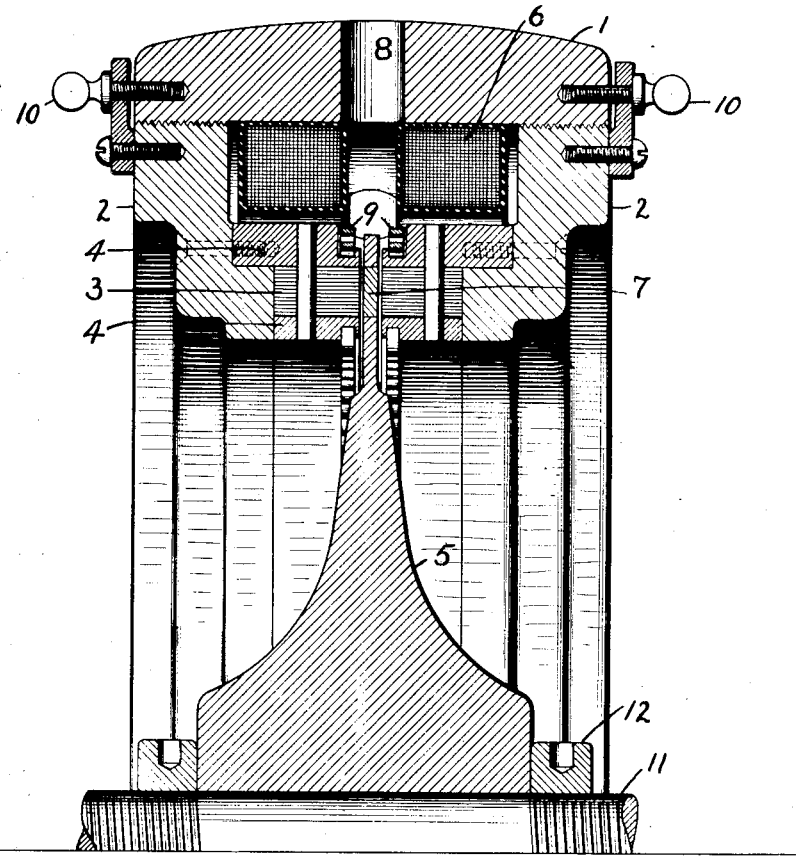
Figure 2:
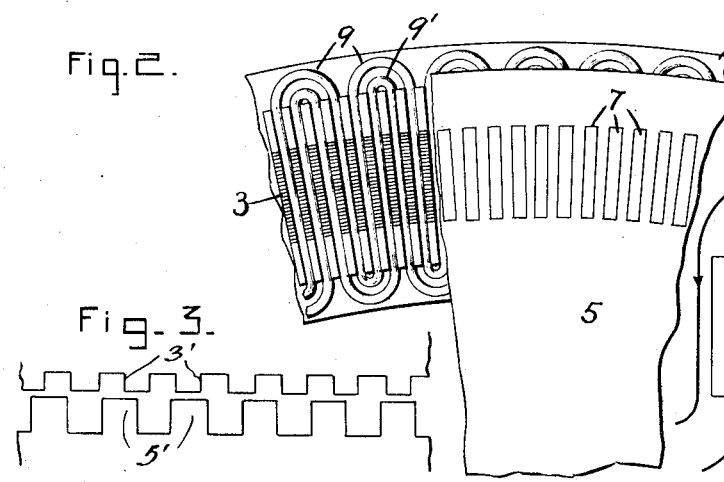
Figure 3:
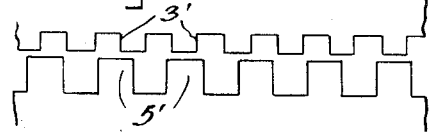
Figure 4:
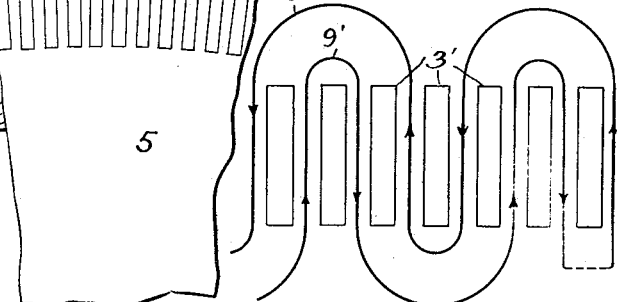

In the drawings Figure 1 shows a vertical cross-section of the upper half of a high frequency alternator arranged in accordance with my invention; Fig. 2 shows an enlarged detail view; and Figs. 3 and 4 are explanatory diagrams.

In the drawings 1 represents the stator into which are screw threaded a pair of ring shaped members 2—2. Each of these members carries a circumferentially extended laminated ring 3 clamped between two rings 4. These laminated rings have opposite faces lying in adjacent radial planes. Between these rings extends the periphery of a solid magnetic inductor 5; 6 represents the field coils, the magnetic circuit of which surrounds the coil and passes through the laminated rings 3 and the periphery of the inductor 5. The air gaps between the inductor and laminated rings lie in radial planes. The inductor 5 near its periphery is cut through so as to form rectangular holes or radial slots as is best shown in Fig. 2, so that magnetic poles are formed between these holes or slots. In order to avoid excessive windage at the highest speeds at which the inductor is designed to operate, the slots in the inductor periphery are filled with solid non-magnetic blocks 7 which may be composed of aluminium or other similar material which are riveted into the slots so as to fill them flush with the sides of the inductor. The slots do not extend to the periphery of the inductor, which is therefore left as a continuous ring integral with the rest of the inductor and holds the blocks 7 from displacement by centrifugal force. This gives a mechanically strong construction and a smooth surface to the inductor so as to reduce the windage to a small amount.

Ventilating holes 8 are provided in the stator opposite the periphery of the inductor.

The armature winding is carried in slots in the faces of the laminated rings 3 adjacent the inductor poles. This armature winding as shown in Fig. 2 comprises in effect two windings 9 and 9' which are carried zig-zag across the faces of the laminated rings 3, the adjacent loops or coils of each winding being placed not in adjacent slots but displaced from each other by a certain number of slots. The object of this arrangement of winding may be made clear by a reference to Figs. 3 and 4. For very high frequencies, it is necessary to give an inductor a large number of poles. Now if the stator slots are made equal in number to the inductor poles the total flux will pulsate every time an inductor pole passes a stator slot because when each inductor pole is opposite a stator slot the reluctance is comparatively high while at the next instant when each inductor pole is opposite a stator tooth the reluctance is comparatively low. This variation in reluctance and the consequent pulsation of flux could be avoided by making the number of the stator slots a multiple of the number of inductor poles, as is done in ordinary low frequency inductor machines, but if the number of inductor poles is made very great to give a very high frequency these poles become very small and it becomes mechanically impossible to make the stator slots even twice the number of the inductor poles. I have avoided both these difficulties, of pulsation of the total flux, on the one hand, and stator teeth too small to be mechanical, on the other hand, by the arrangement shown diagrammatically in Figs. 3 and 4.

In Fig. 3 the stator teeth are indicated diagrammatically at 3', and the inductor poles are indicated diagrammatically at 5'. It will be seen that the number of stator slots is greater than, but less than twice, the number of inductor poles. The ratio shown is 4 to 3. Each winding of the armature as for instance 9' has its adjacent loops or coils displaced by a distance equal to 4 slots or teeth of the stator, and therefore equal to three inductor poles. Since adjacent coils of the winding are displaced by a multiple of the number of inductor poles, all the coils of winding 9' are at each instant in the same magnetic relation with respect to poles of the inductor; that is, when an inductor pole is directly opposite any one of these coils other poles are directly opposite all the other coils of this winding. Thus the induced electromotive forces in all the coils are in phase. The other winding 9 is similarly arranged, and the two windings 9 and 9' are connected in series as indicated by the dotted line at the right hand end of Fig. 4 so that these two windings together compose the armature winding of the machine.

As has already been pointed out the supporting members 2 of the laminated rings 3 are screw threaded into the stator 1. The purpose of this is to make each of the laminated rings axially adjustable toward or away from the inductor so as to adjust the air gap. The members 2 when properly adjusted may be locked by the pins 10 carried by the members 2 and adapted to enter into any one of a circumferential series of holes in the side of the stator.

The claims of the present application are restricted to the novel form of winding and to the novel arrangement of stator slots and rotor poles which I have devised for use in connection with the high frequency alternator described in my aforementioned patent. Claims to the improved construction of inductor have been made in a companion application filed as a division of this application.

I do not desire to limit myself to the particular construction and arrangement of parts shown and described but aim in the appended claims to cover all modifications which are within the scope of my invention.

What I claim as new and desire to secure by Letters Patent of the United States, is,

1. A high frequency alternator comprising an inductor adapted to be driven at high speed and having a large number of magnetic poles, a stator having slots adjacent to the inductor poles, the number of stator slots bearing to the number of inductor poles the ratio $\frac{N}{n}$, said ratio being greater than 1 and less than 2, and a winding carried in the stator slots having its adjacent coils displaced by a distance equal to N slots.

2. A high frequency alternator comprising an inductor adapted to be driven at high speed and having a large number of magnetic poles, a stator having slots adjacent to the inductor poles, the number of stator slots bearing to the number of inductor poles the ratio $\frac{N}{n}$, said ratio being greater than 1 and less than 2, and a plurality of windings carried in the stator slots each having its adjacent coils displaced by a distance equal to N slots, said windings being connected together to form the armature winding of the alternator.

3. A high frequency alternator, comprising an inductor adapted to be driven at high speed and having a large number of magnetic poles, a stator having slots adjacent to the inductor poles, the number of stator slots being greater than, but less than twice, the number of magnetic poles, and a winding carried in the stator slots having its adjacent coils displaced by a distance equal to a multiple of the distance between the adjacent inductor poles.

4. A high frequency alternator comprising an inductor adapted to be driven at high speed and having a large number of magnetic poles, a stator having slots adjacent to the inductor poles, the number of stator slots being greater than, but less than twice, the number of magnetic poles, and a plurality of windings carried in the stator slots each having its adjacent coils displaced by a distance equal to a multiple of the distance between adjacent inductor poles, said windings being connected together to form the armature winding of the alternator.

In witness whereof, I have hereunto set my hand this 17th day of October, 1911.

ERNST F. W. ALEXANDERSON.

Witnesses:
BENJAMIN B. HULL,
HELEN ORFORD.